United States Patent

[11] 3,628,917

| [72] | Inventor | Larry George Nault<br>Warren, Pa. |
|---|---|---|
| [21] | Appl. No. | 736,111 |
| [22] | Filed | June 11, 1968 |
| [45] | Patented | Dec. 21, 1971 |
| [73] | Assignee | Struthers Scientific and International<br>Corporation |
| [32] | Priority | July 26, 1967 |
| [33] | | Great Britain |
| [31] | | 34,352/67 |

[54] DEVICE FOR EVAPORATIVE CRYSTALLIZATION
1 Claim, 1 Drawing Fig.

[52] U.S. Cl. .................................................. 23/273 R, 159/45
[51] Int. Cl. .................................................. B01d 9/02
[50] Field of Search ........................................ 23/273, 273 F; 159/1 C, 42, 43, DIG. 25

[56] References Cited
UNITED STATES PATENTS

| 2,567,986 | 9/1951 | Saeman | 23/273 |
| 2,827,366 | 3/1958 | Saeman | 23/273 |
| 3,137,544 | 6/1964 | Ebner | 23/273 |
| 3,218,133 | 11/1965 | Ebner | 23/273 |
| 3,261,670 | 7/1966 | Chirico | 23/273 |

Primary Examiner—Norman Yudkoff
Assistant Examiner—R. T. Foster
Attorney—William A. Drucker ABSTRACT: A large size crystallizer has a separate vacuum evaporation chamber and a crystallizer tank. The crystallizer tank has fluid enter its bottom to flow upward past a flow distribution device and leave at its upper portion where a centrally located funnel collects fluid at a given fluid level.

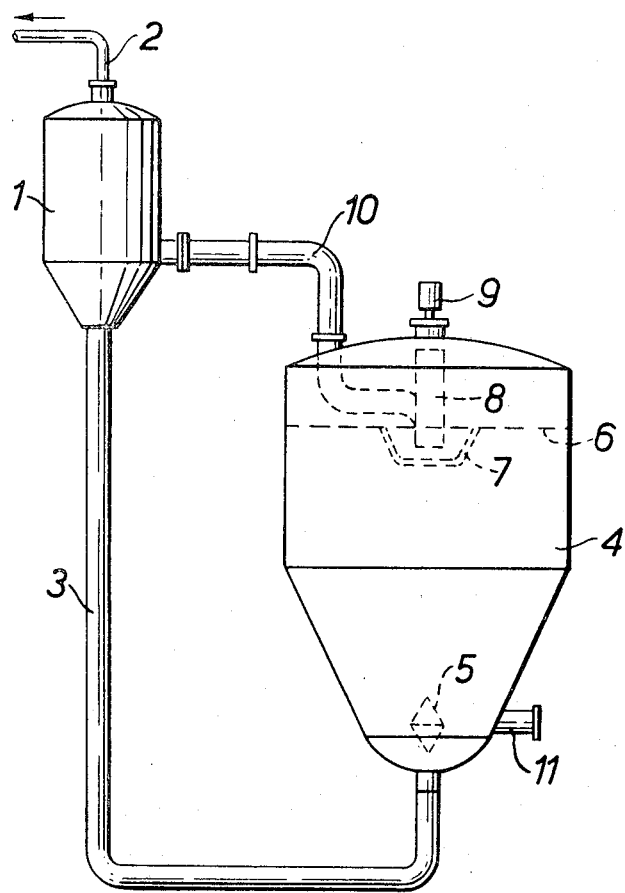

DEVICE FOR EVAPORATIVE CRYSTALLIZATION

BACKGROUND OF THE INVENTION

Large size crystallizers are now required to crystallize salts, such a potassium chloride, from a water solution at a competitive cost. If such large size crystallizers are built in the conventional manner with the vacuum evaporator formed integrally with the crystallizer, cooled liquid enters the crystallizer tank flowing downward in a large central pipe. It has been found that deposits build up at the end of this central pipe in a ring about the bottom of the crystallizer. This ring restricts flow to cause flow disturbances and excessive nucleation. In addition, fluid is withdrawn from conventional crystallizers by one or more laterally located flow ports. These laterally located flow ports in the upper parts of conventional crystallizers cause unequal flow at the fluid surface so that there is a tendency to have crystals picked up and recirculated. The crystallizer of this invention overcomes these difficulties in crystallizers of 30 feet in diameter or more.

SUMMARY OF THE INVENTION

A large crystallizer has a separate vacuum evaporation chamber located above it and connected to a vacuum line. Flow from the bottom of the evaporation chamber passes through a pipe to the bottom of the crystallizer. Thus the flow into the crystallizer is directed upward. A flow distributor, such as a double cone, is disposed near the inlet pipe of the crystallizer. In the upper portion of the crystallizer there is centrally located a funnel into which mother liquor overflows to provide uniform and radially even surface flow of mother liquor. Extending downward into this funnel is a pump which pumps liquid therefrom through a return pipe to the vacuum evaporator.

The crystallizer of this invention, for sizes of 30 feet in diameter and over, delays the buildup of deposits and provides a more even flow therein.

BRIEF DESCRIPTION OF THE DRAWING

The FIG. of the Drawing shows a side view of a large size crystallizer according to this invention.

DESCRIPTION OF THE PREFERRED EMBODIMENT

A vacuum evaporator 1 is connected to a vacuum line 2 to cool mother liquor therein. Mother liquor flows through pipe 3 to enter the bottom of crystallizer 4. The pipe 3 enters crystallizer 4 vertically so that an upward flow results therein. A flow distributor 5 consists of two conical elements joined by their bases. Perforated plate type flow distributors could also be used. Flow of mother liquor through a suspension of crystals growing therein takes place in crystallizer 4. At the fluid level 6 an upwardly disposed funnel 7 is centrally located to have mother liquor flow over its rim. A pump 8 driven by motor 9 recirculates mother liquor through pipe 10 to the vacuum evaporator 1. A crystal slurry outlet fitting 11 is shown. A mother liquor inlet fitting (not shown) may be provided in line 3.

Large size crystallizers, as have been described, would generally be used in series. If five or six stages were used, a single structural tower could support the evaporators of all the stages while the larger and heavier crystallizers were supported on the ground by pipe legs or the like. The entrance to the crystallizer 4 could be readily accessible through a suitable man way (now shown) should cleaning of deposits be required. Deposits are less likely in the crystallizer 4 of this invention as flow is upward with little sideward motion. This is desirable as only the upward components of velocity of the mother liquor in a crystallizer are capable of suspending crystals.

The central location of the pump 8 and funnel 7 provide a more uniform flow upward within the crystallizer 4. This allows a higher circulation rate of mother liquor without circulating crystals.

While this invention has been shown and described in the best form known, it will nevertheless be understood that this is purely exemplary and that modifications may be made without departing from the spirit and scope of the invention.

What is claimed is:

1. In a large vacuum evaporation crystallizer, the improvement comprising, in combination:
   a. a vacuum evaporator, saturating the mother liquor therein by vacuum evaporation;
   b. a generally cylindrical crystallizer, having a tapering bottom;
   c. a pipe conducting cooled mother liquor from said vacuum evaporator to discharge and flow upward into the bottom of said crystallizer;
   d. a flow distributor in the bottom of said crystallizer evenly distributing upward flow of mother liquor entering said crystallizer from said pipe;
   e. an upwardly disposed open pan with a closed bottom in the center of the upper portion of said crystallizer, said pan having an open rim over which mother liquor flows into said pan; and
   f. a pump drawing mother liquor from said open pan and recirculating at least some of the mother liquor to said vacuum evaporator.

* * * * *